United States Patent [19]
Ginns

[11] Patent Number: 4,875,007
[45] Date of Patent: Oct. 17, 1989

[54] EDDY CURRENT PROXIMITY SYSTEM

[75] Inventor: Haskell Ginns, Belmont, Mass.

[73] Assignee: The Indikon Company, Inc., Cambridge, Mass.

[21] Appl. No.: 292,640

[22] Filed: Dec. 30, 1988

Related U.S. Application Data

[63] Continuation of Ser. No. 159,507, Feb. 17, 1988, abandoned, which is a continuation of Ser. No. 786,145, Oct. 8, 1985, abandoned, which is a continuation of Ser. No. 444,442, Nov. 24, 1982, abandoned.

[51] Int. Cl.$^4$ .......................... G01B 7/14; G01N 27/90
[52] U.S. Cl. ..................................... 324/207; 324/227; 324/236
[58] Field of Search ................ 324/207, 208, 222–224, 324/227, 228, 232–236, 239–243, 260, 262, 61 QS, 57 QS, 60 CD, 230; 340/870.31, 870.32, 870.37

[56] References Cited

U.S. PATENT DOCUMENTS

| | | | |
|---|---|---|---|
| 3,163,818 | 12/1964 | Spaven | 324/57 Q |
| 3,249,860 | 5/1966 | Huggins | 324/202 X |
| 3,609,531 | 9/1971 | Förster | 324/227 |
| 3,750,010 | 7/1973 | Abnett et al. | |
| 3,757,208 | 9/1973 | Brunner | 324/230 |
| 3,826,973 | 7/1974 | Pflaum | |
| 3,851,242 | 11/1974 | Ellis | |
| 3,974,442 | 8/1976 | Savidge et al. | |
| 3,990,002 | 11/1976 | Baum | 324/54 X |
| 4,040,041 | 8/1977 | Fletcher et al. | 340/870.37 |
| 4,053,849 | 10/1977 | Bower et al. | 324/207 X |
| 4,101,791 | 7/1978 | Atkins et al. | |
| 4,106,006 | 8/1978 | Atkins | |
| 4,195,286 | 3/1980 | Galuin | |
| 4,353,029 | 10/1982 | Abbe et al. | 324/222 X |
| 4,355,281 | 10/1982 | Toth et al. | 324/232 |
| 4,446,427 | 5/1984 | Lourenich | 324/207 |
| 4,450,443 | 5/1984 | Dolland | 340/870.32 X |

FOREIGN PATENT DOCUMENTS 930105 5/1982 U.S.S.R. .............................. 324/222

Primary Examiner—Reinhard J. Eisenzopf
Assistant Examiner—Warren S. Edmonds
Attorney, Agent, or Firm—Weingarten, Schurgin, Gagnebin & Hayes

[57] ABSTRACT

A proximity detection system having two eddy current probes, one a measurement and the other a reference probe. In one embodiment, one probe is energized by a high frequency AC signal and the other by a DC signal. The energizing signals are periodically switched between the two probes and the difference between responses of the probes when AC energized is detected. The difference eliminates drift and variations in the probe outputs from environmental effects like temperature, one of the probes measures the proximity of a selected material, and the other probe is set-up with a target of the same material at a constant distance, as a reference. The DC constant current signal which alternately energizes each probe when not energized by the AC signal, prevents each probe from being dead when not energized by the AC signal. The probes are operated in a resonant mode to increase both the system linearity and sensitivity to target position.

8 Claims, 1 Drawing Sheet

EDDY CURRENT PROXIMITY SYSTEM

This application is a continuation of application Ser. No. 07/159,507, filed Feb. 17, 1988, now abandoned, which is a contintuation of prior Ser. No. 06/786,145, filed Oct. 8, 1985, now abandoned, which is a continuation of Ser. No. 444,442, filed 11/24/82, now abandoned.

FIELD OF THE INVENTION

The field of the present invention includes eddy-current probes for proximity detection systems.

BACKGROUND OF THE INVENTION

One of the major limitations in measuring displacement with eddy-current proximity probes is their sensitivity to temperature which affects both the zero reading and the change (or span) of signal relative to the in target proximity. To reduce the effect of temperature on the zero value, one approach is to use two matched proximity probes, one positioned near a fixed metallic target, the other opposite the metallic surface whose displacement is to be measured. Each probe is then part of separate oscillator-detector circuits whose signals are subtracted from each other. While this approach is an improvement, it still suffers from uncertainties due to long term drifts in the different circuit components, as well as from the need to carefully match circuit characteristics over the temperature and voltage changes of the particular environment.

Probe sensitivity can be greatly increased by near resonance capacitive tuning of the probe inductance. The tuning effect, however, is incompatible with prior art circuitry used to compensate for thermal effects, and will augment the resulting errors.

BRIEF DESCRIPTION OF THE INVENTION

In an eddy-current proximity system of the present invention a single oscillator-detector circuit periodically energizes first one probe and then another probe of a set of matched probes, eliminating sources of errors from different driving circuits. A second oscillator of relatively low frequency causes the two probes to be alternately energized by the high frequency oscillator. The output of a constant current source is switched to the unenergized probe to maintain the probe in an "alive" condition when not oscillator energized. One of the two probes is operated as a reference probe set with a fixed gap within or outside of the measurement range of the other probe which actively measures a varying gap.

The outputs of the two probes under conditions of alternate oscillator energization are combined to produce a signal periodically varying between the magnitude of the active probe output and the magnitude of the reference probe output at the alternating switching rate. These two magnitudes are affected similarly by the effects common to both sensors so that the difference is free of many probe errors.

This periodically varying signal is detected and low-pass filtered to produce an output representing the difference, and thus representing the gap measured by the active probe.

Changes in probe sensitivity are reduced by including a thermistor or other temperature-sensitive element in a circuit controlling the current from the energizing oscillator, so that the probe current is increased with temperature to offset the probe decrease in sensitivity. The probes are also operated in a tuned mode which improves their linearity along with greatly increasing sensitivity.

BRIEF DESCRIPTION OF THE DRAWING

These and other features of the present invention are better understood by reading the following, solely exemplary, detailed description along with the drawing wherein.

DETAILED DESCRIPTION OF THE INVENTION

Figure 1:
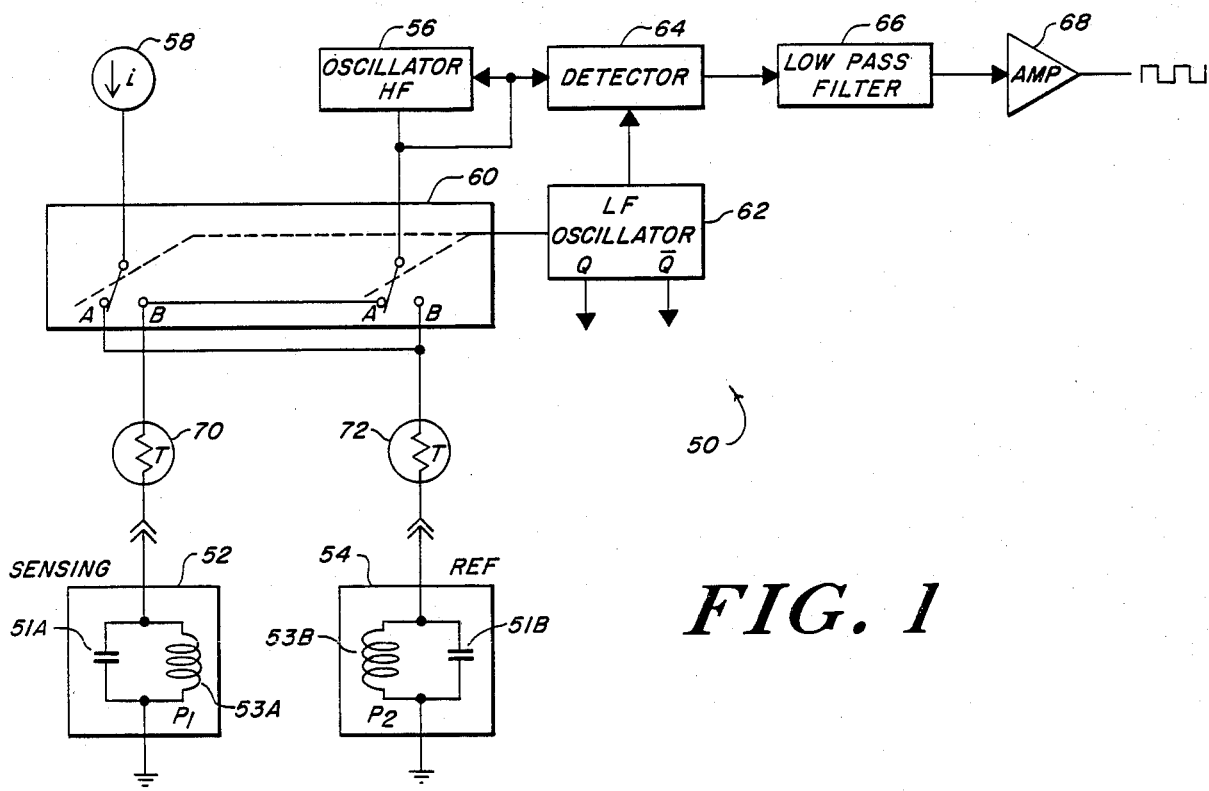
FIG. 1 is a block and schematic diagram of an eddy-current proximity probe system according to the present invention.

The block diagram of an eddy-current probe system is shown in FIG. 1. Two eddy-current probe assemblies 52 and 54 are alternately driven by a high frequency oscillator 56 and a constant current source 58 through a switch 60. One assembly actively measures a variable gap to a metal target while the other measures a fixed gap, acting as a reference. The switch 60 alternately energizes the probe assemblies 52 and 54 by the oscillator 56. The probe not oscillator energized is energized by DC current source 58 by switch 60. Switch 60 is controlled by a low frequency oscillator 62. The frequency of the signal produced by the oscillator 62 is much lower than the signal from the oscillator 56. Typical frequencies are 100 Hz and 200 KHz, respectively. The amplitude of the signal from oscillator 56 varies with the loads imposed by the alternately connected probe assemblies 52 and 54 due to eddy-currents induced by the probes in adjacent targets; the closer the target, the greater the eddy current and the lower the amplitude. The resulting signal, or probe output, is applied to a detector 64 which rectifies the high frequency AC signal to provide an analog signal corresponding to the differences in amplitude of the oscillator signal during the two energization intervals. A low-pass filter 66 receives the detector output and passes an AC signal having the period of the oscillator 62 and an amplitude representing the gap being measured; the DC component is not transmitted. The resulting AC signal is amplified by amplifier 68.

To compensate for a decrease in probe sensitivity with temperature, a temperature sensitive element (thermistor or diode 72) is included in a network which controls the amplitude of oscillator 56 (at a given gap) and causes signal from the oscillator to increase with temperature by the amount corresponding to the decrease in probe sensitivity.

Within the probe assemblies 52 and 54, the current from the oscillator 56 is applied to inductors 53A and 53B of the probe itself. These inductors are tuned near resonance by capacitors 51A and 51B respectively. The tuning is such as to increase the Q of the tuned probe with increasing gap. This has the advantage of both increasing the probe sensitivity and linearizing the relationship between changes in oscillator amplitude and changes in gap.

Figure 2:
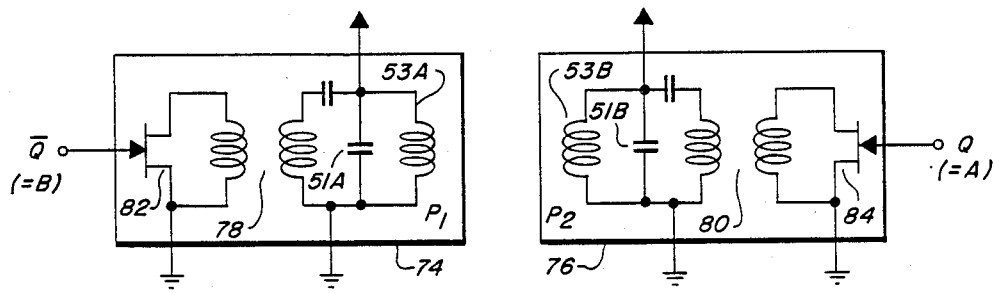
FIG. 2 is an alternate probe for use in the circuit of FIG. 1.

An alternate probe configuration is shown by probe assembly pair 74 and 76 in FIG. 2. In order to maintain a matched temperature environment for the two probes, it is desirable to place the probes in close proximity. However, the juxtaposition of two probes which have the same resonant frequency may cause the oscillator signal to be coupled from the energized probe to the other probe, impairing the proximity measurement. The circuitry of FIG. 2 is provided to avoid this effect. Coupling transformers 78 and 80 have the primary coils across the probe inductors and have field effect transistors (FET's) 82 and 84 connected across the secondaries. The FETs 82 and 84 are controlled by oscillator 62. The oscillator 62 is of a design having complementary output signals Q and $\overline{Q}$ of 180 degree opposite square wave form. The transistor 84 is activated or made conductive when the probe assembly 74 is energized by the oscillator 56, and the transitor 82 is made conductive when the probe 76 is activated. In this manner, each probe is given an AC shunt when not oscillator energized but maintains its DC characteristics due to current from source 58, which in another embodiment may be another oscillator.

Figure 3:
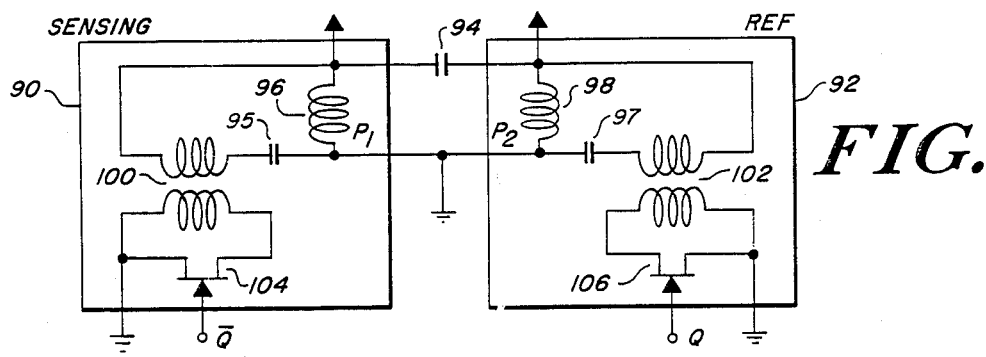
FIG. 3 is a second alternate probe for use in the circuit of FIG. 1.

FIG. 3 illustrates a further probe configuration in which probe components are shared, minimizing errors from differential drifting of different components. In particular, the resonated probe assemblies 92 and 90 share a common tuning capacitor 94 for the two probe inductors 96 and 98. The AC characteristics of each of the inductive elements 96 and 98 are selectively suppressed by shunting the signals induced across them by respective transformers 100 and 102 and FET's 104 and 106. The FET's 104 and 106 are alternately energized by the Q and $\overline{Q}$ signals respectively, generated by the oscillator 62. During oscillator 56 energization of the probe assembly 90, the transistor 106 is energized, providing an AC shunt across the inductive element 98. Similarly, when the probe 92 assembly is energized and FET 106 is open, the inductive component 96 is shunted by closing the circuit through FET 104. In this manner, the deactivated probe continues to receive current as though it were being driven by the oscillator 56 at the point of maximum current and minimum voltage, maintaining it in an "alive" condition that reduces switching transients. Moreover, the shunting action of the FET's 104 and 106 also permit the inductive elements 96 and 98 to be located relatively close to one another without coupling signals therebetween.

The detector 64 of FIG. 1 includes a demodulator which can be either a simple envelope diode rectifier or a synchronous detector. The detector 64 may also include sample and hold circuitry to avoid receiving signals from the oscillator 56 during the transitions produced by the oscillator 62. For example, the sample and hold circuitry may hold the value of the oscillator 56 signal for 0.1 millisecond before and 0.2 millisecond after the switching of the probe energizing signal. Thereafter, the sample and hold circuits are released. In this way, only the steady state oscillator conditions are measured, and the transient conditions are ignored.

An alternate embodiment provides good high frequency response by changing the period and/or the duty cycle of oscillator 56 so that the reference probe 54 is "looked at" for only a short period of time (e.g., 10 milliseconds) once every few seconds. If the reference probe is sampled infrequently, it will be necessary to store the DC equivalent of its amplitude in some manner, such as with a sample and hold circuit, and then use the resulting signal as the system "zero".

Implementations of the block sections by various means known in the art shown in FIG. 1 are within the scope of the invention. Similarly, the substitution of equivalents of the specific components used for the probes as described are also within the scope of the present invention. Therefore, the present invention is not to be limited to the above described embodiment except according to the claims which follow.

What is claimed is:

1. An eddy-current probe system for detecting distance to a metallic target comprising:
   a first probe for sensing the metallic target at a first distance and providing a first output corresponding to the first distance of said first probe to the metallic target;
   a second probe for sensing a metallic reference target at a reference distance and providing a second output corresponding to the reference distance of said second probe to the metallic reference target;
   said first and second outputs having amplitudes compensated for environmental effects experienced by said first and second probes;
   a first source of excitation comprising a single high frequency oscillator providing a high frequency AC excitation signal;
   means for providing resonant tuning of said first and second probes in response to excitation from said single high frequency oscillator;
   switch means connected to said first probe, said second probe and said single high frequency oscillator for selectively energizing each said first and second probes by said high frequency AC excitation signal from said single high frequency oscillator periodically wherein said first and second probes periodically provide said first and second outputs respectively representative of the first and the reference distances;
   means for causing said switch means to periodically switch said high frequency Ac excitation signal from said single high frequency oscillator between said first and second probes, respectively;
   alternate excitation of said first and second probes by said single high frequency oscillator providing periodically said first and second outputs having amplitudes similarly affected by environment effects; and
   means for providing a periodic output signal having an amplitude variation corresponding to differences in amplitude between the periodically provided first and second outputs and compensated for environmental effects due to said alternate excitation of said first and second probes by said single high frequency oscillator, the amplitude variation corresponding to the first distance of said first probe to the metallic target.

2. An eddy-current probe system for detecting distance to a metallic target, comprising:
   a first probe for sensing the metallic target at a first distance;
   a second probe for sensing a metallic reference target at a reference distance;
   a first source of excitation comprising a single high frequency oscillator providing a high frequency AC excitation signal;
   means for providing resonant tuning of said first and second probes in response to excitation from said single high frequency oscillator;
   switch means connected to said first probe, said second probe and said single high frequency oscillator for selectively energizing each said first and second probes by said high frequency AC excitation signal from said single high frequency oscillator periodically wherein said first and second probes periodically provide first and second outputs, respectively, representative of the first and the reference distances;

means for causing said switch means to periodically switch said high frequency AC excitation signal from said single high frequency oscillator between said first and second probes, respectively;

a second source of probe excitation to maintain said first and second probes in an energized condition;

said switch means including means for connecting excitation from said second source to said first probe when said switch means energizes siad second probe by said high frequency AC excitation signal from said single high frequency oscillator and alternately connecting said second source to said second probe when said switch means energizes said first probe by said high frequency AC excitation signal from said single high frequency oscillator; and means for providing a periodic output signal having an amplitude variation corresponding to differences in amplitude between the periodically provided first and second outputs, the amplitude variation corresponding to the first distance of said first probe to the metallic target.

3. The system of claim 2 wherein said second source is an oscillator.

4. The system of claim 2 wherein said second source is a DC source to periodically provide a constant source current to said first and second probes, respectively.

5. The system of claim 1 wherein said switch means includes means for inductively coupling said high frequency AC excitation signal between said first and second probes and means for inhibiting the application of said high frequency AC excitation signal to one of said probes when the other of said probes is excited by said single high frequency oscillator.

6. The system of claim 1 further including:
means for providing common tuning of said first and second probes.

7. An eddy-current probe system for detecting distance to a metallic target, comprising:

a first probe for sensing the metallic target at a first distance;

a second probe for sensing a metallic reference target at a reference distance;

a first source of excitation comprising a single high frequency oscillator providing a high frequency AC excitation signal;

means for providing resonant tuning of said first and second probes in response to excitation from said single high frequency oscillator, said resonant tuning means including means for providing common tuning of said first and second probes and wherein said means for providing common tuning comprises a capacitor common to each of said first and second probes;

said first and second probes include inductive elements; and means are provided for shunting of the inductive elements in the oscillator-unenergized one of said first and second probes;

switch means connected to said first probe, said second probe and said single high frequency oscillator for selectively energizing each said first and second probes by said high frequency AC excitation signal from said single high frequency oscillator periodically wherein said first and second probes periodically provide first and second outputs, respectively, representative of the first and the reference distances;

means for causing said switch means to periodically switch said high frequency AC excitation signal from said single high frequency oscillator between said first and second probes, respectively; and means for providing a periodic output signal having an amplitude variation corresponding to differences in amplitude between the periodically provided first and second outputs, the amplitude variation corresponding to the first distance of said first probe to the metallic target.

8. The system of claim 1 wherein said switch means causes switching transients in the output signal and means are provided for eliminating said transients from the output signal.

* * * * *